United States Patent [19]
Fujimura et al.

[11] Patent Number: 5,154,368
[45] Date of Patent: Oct. 13, 1992

[54] SEAT BELT RETRACTOR WITH DEFORMABLE EMERGENCY LOCK MECHANISM

[75] Inventors: Yoshiichi Fujimura; Shizutaka Matsuura, both of Shiga, Japan

[73] Assignee: Takata Corporation, Tokyo, Japan

[21] Appl. No.: 625,135

[22] Filed: Dec. 7, 1990

[30] Foreign Application Priority Data

Dec. 26, 1989 [JP] Japan ................... 1-337499

[51] Int. Cl.⁵ ............... B60R 22/40; B60R 22/42; B60R 22/28
[52] U.S. Cl. ................ 242/107.2; 280/806; 280/805; 297/478; 297/472
[58] Field of Search ............ 242/107.2; 280/806, 280/808, 805; 297/472, 476, 478, 479

[56] References Cited

U.S. PATENT DOCUMENTS

| 3,481,624 | 12/1969 | Barecki et al. | 280/805 |
| 3,583,530 | 6/1971 | De Venne | 280/805 |
| 4,211,377 | 7/1980 | Yasumatsu | 242/107.2 |
| 4,328,976 | 5/1982 | Tsuge et al. | 280/806 |
| 4,381,086 | 4/1983 | Pfeiffer | 280/805 |
| 4,394,034 | 7/1983 | Murphy et al. | 280/806 |
| 4,422,593 | 12/1983 | Takada | 242/107.2 |
| 4,461,492 | 7/1984 | Miki | 297/472 |

FOREIGN PATENT DOCUMENTS 2208264 3/1989 United Kingdom ............... 280/806
2217973 11/1989 United Kingdom .

Primary Examiner—Daniel P. Stodola
Assistant Examiner—John Q. Nguyen
Attorney, Agent, or Firm—Kanesaka and Takeuchi

[57] ABSTRACT

A seat belt retractor comprising a first emergency lock mechanism for locking a reel shaft around which a seat belt is wound and a second emergency lock mechanism for sandwiching and locking said seat belt drawn out from the reel shaft by a rotatable member which pivots on one of its ends. The rotatable member has a deformable portion which is deformed so that the distance from the center of rotation to the sandwiching face of the seat belt may be shortened.

8 Claims, 12 Drawing Sheets

FIG. 10
PRIOR ART

SEAT BELT RETRACTOR WITH DEFORMABLE EMERGENCY LOCK MECHANISM

FIELD OF THE INVENTION AND RELATED ART STATEMENT

The present invention relates to a seat belt apparatus for protecting an occupant in a vehicle. More particularly, the present invention relates to a seat belt retractor comprising first and second emergency lock means for locking a reel shaft, around which shaft a seat belt is wound and for locking the seat belt, respectively.

Figure 10:
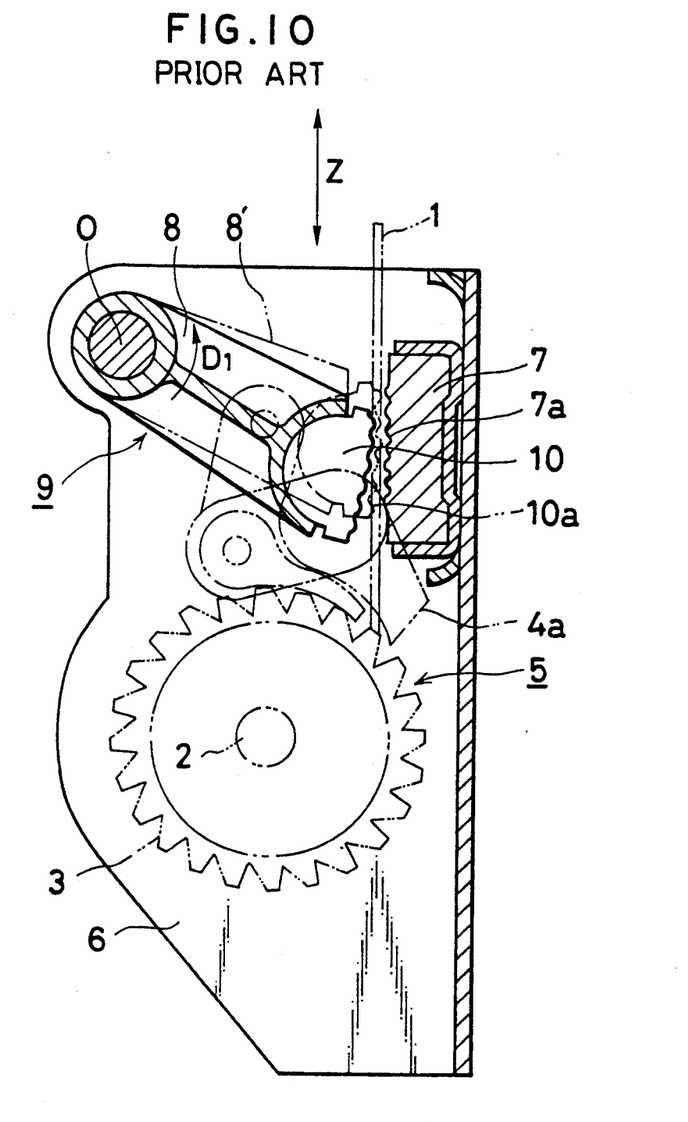
FIG. 10 is a sectional elevational view showing a conventional seat belt retractor.

Conventionally, there is a seat belt retractor shown in FIG. 10 which comprises first and second emergency lock means for locking a reel shaft, around which shaft a seat belt is wound and for locking the seat belt itself, respectively.

The seat belt retractor shown in FIG. 10 has first and second lock mechanisms 5 and 9. The first mechanism 5 comprises a reel shaft 2 around which a seat belt 1 is wound and a ratchet wheel 3 coaxially and integrally attached to the reel shaft 2. The reel shaft 2 is locked by engaging catching means 4a with the ratchet wheel 3. The second mechanism 9 comprises a rotatable member 8, a base end portion of which is rotatably attached to a case 6 and a pusher 10 being attached to a tip portion of the rotatable member 8, and a slider 7 which is attached to the case 6 so as to face the rotatable member 8 and to slide in the direction shown by an arrow Z. The seat belt 1 which is drawn out from the reel shaft 2 is locked by being sandwiched between the slider 7 and a pusher 10.

Contact faces 10a and 7a of the pusher 10 and the slider 7, respectively, with the seat belt 1 are smoothly and unevenly formed perpendicularly to the direction of winding the seat belt 1 on or off the reel shaft 2.

With a structure comprising the first and second emergency lock mechanisms 5 and 6, as not only the reel shaft 2 but also seat belt 1 itself is locked, a great extent of reliability can be obtained.

In an emergency such as a collision, it is possible that force which is above the breaking strength of the seat belt 1 that is sandwiched acts on the seat belt 1.

That is, in a normal sandwiched or holding state of the seat belt 1, the seat belt 1 is sandwiched and locked by the rotatable member 8' by rotating from the state shown to FIG. 10 in the direction shown by an arrow D₁ (shown as 8').

However, when the seat belt 1 is sandwiched between the rotatable member 8 and the slider 7, if, further, strong force to draw the seat belt 1 out is given, by friction force of the holding or sandwiching portions, the upper edge portion of the pusher 10 of the rotatable member 8 enter into the seat belt 1 so as to snap the seat belt 1 stronger. In this way, snapping force is given intensively to the sandwiched portion of the seat belt 1. Thus, the seat belt 1 should have an extremely strong strength so that it may never break even when this strong snapping force is given locally intensively.

OBJECT AND SUMMARY OF THE INVENTION

An object of the present invention is to provide a seat belt retractor with high reliability which avoids breaking of a seat belt and which can secure the safety of an occupant.

Another object of the present invention is to provide a seat belt retractor with which material of small breaking strength can be used as the material of a seat belt.

In a seat belt retractor of the present invention, a deformable portion is provided at a rotatable member which portion is deformed so as to shorten the distance from the center of rotation of the rotatable member to the seat belt contact face of a pusher.

In the present invention, in case force given to a seat belt is below a predetermined extent, the deformable portion is not deformed and the seat belt is snapped and locked in this state. On the other hand, if force given to the seat belt is above the predetermined extent, the deformable portion is deformed so as to shorten the distance from the center of rotation to the seat belt contact face. In this case, by the deformation of the deformable portion, snapping force enough to snap the seat belt itself can not be obtained, but as the seat belt is locked by a first emergency lock means which locks a reel shaft, breaking of the seat belt can be avoided and at the same time, the safety of an occupant can be secured.

DESCRIPTION OF THE PREFERRED EMBODIMENTS

The present invention is described below with reference to the drawings.

A seat belt retractor shown in FIGS. 1 through 4 comprises a frame 200, a reel shaft 11 provided at the frame 200, and first and second lock mechanisms 15 and 17 which mechanisms are described in detail below. The first lock mechanism 15 comprises the reel shaft 11 which is rotatable according to winding of a seat belt 12 on and off the reel shaft 11, a rachet wheel 13 (shown in FIG. 4C) provided coaxially and integrally with respect to the reel shaft 11, and a first catching member 14 which can tilt so as to be located at an engaging position with the ratchet wheel 13 or alternatively, at a disengaging position from the ratchet wheel 13. The first lock mechanism 15 locks the rotation of the reel shaft 11 by engaging the first catching member 14 with the ratchet wheel 13. The second lock mechanism 17 comprises a second catching member 16 which is in the directions designated as $G_1$ and $G_2$ rotatably movably attached to a transmission member 36 so that a pawl portion 16a may be located at an engaging position with the ratchet wheel 13, or alternatively, at a disengaging position from the ratchet wheel 13. The second lock mechanism 17 further comprises a rotatable member 30 and a slider 22 which sandwich and lock the seat belt 12 when the pawl portion 16a of the second catching member 16 is engaged with the ratchet wheel 13. The seat belt retractor further comprises an acceleration sensor 35 and a lock ring 18, which lock ring 18 makes the first and the second catching members 14 and 16 to be engaged with the ratchet wheel 13 mutually independently by detection of acceleration above a predetermined extent by the acceleration sensor 35.

The other end of the reel shaft 11 is connected to one end of a spiral return spring 19. The other end of the return spring 19 is fixed to a side face 201 of the frame 200. Accordingly, the seat belt 12 is wound off the reel shaft 11 against the biasing force of the return spring 19 and is wound on the reel shaft 11 by the biasing force of the return spring 19.

Next, the first emergency lock mechanism 15 is described in detail with reference to FIG. 2 also.

Figure 2:
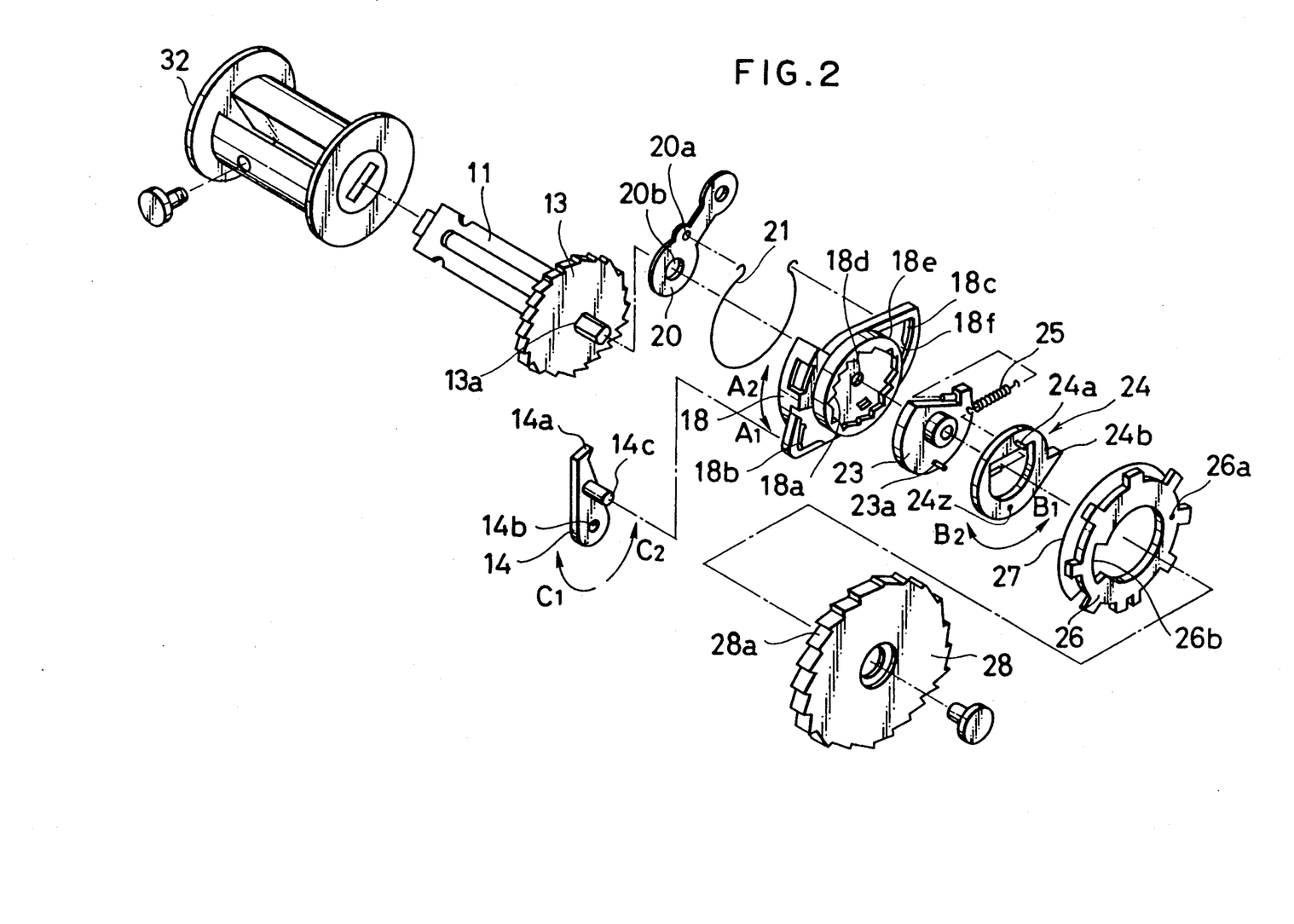
FIG. 2 is an exploded perspective view of mainly a first emergency lock mechanism which locks a reel shaft around which a seat belt is wound.

As shown in FIG. 2, a protruding portion 13a which is coaxial with respect to the reel shaft 11 is formed outside the ratchet wheel 13 which rachet wheel 13 is fixed to the one end of the reel shaft 11.

A through hole 20b which is formed at one end portion of a tie plate 20 and a through hole 18d which is formed at the center portion of the lock ring 18 are loosely engaged with the protruding portion 13a. One end of a C-shaped spring member 21 is caught in a spring hanger 20a which spring hanger 20a is provided at an approximately center portion of the tie plate 20. The other end of the spring member 21 is caught in a spring hanger 18f of the lock ring 18. Biasing force to rotate in the direction shown by an arrow $A_2$ is always given to the lock ring 18 by the spring member 21.

A reel member 32 is put on the reel shaft 11. The seat belt 12 is wound around the reel member 32.

A hook retainer 23 is fixed to the protruding portion 13a of the ratchet wheel 13 which protruding portion 13a protrudes over the lock ring 18.

A support pin 23a is protrudingly provided so as to be parallel with the direction of the center of the rotation axis of the reel shaft 11 at a peripheral portion of the hook retainer 23. Further, a hook 24 is disposed so as to overlap the hook retainer 23. The hook 24 can sway around the support pin 23a. The support pin 23a pierces a hole 24z.

A compression coil spring 25 intervenes between the hook retainer 23 and the hook 24. The hook 24 is biased to rotate in the direction shown by an arrow $B_1$ around the support pin 23a.

A pawl 24b is provided at a part of the outer periphery of the hook 24, which pawl 24b can be engaged with internal teeth 18a of the lock ring 18. A connect pin 24a which is away from the support pin 23a and is parallel with the support pin 23a is formed at the hook 24. As the hook 24 is biased by the compression coil spring 25, normally (when a large extent of acceleration does not act on the vehicle), the pawl 24b is disengaged from the internal teeth 18a.

The connect pin 24a is put in a catching hole 26a which catching hole 26a is provided at the outer periphery of a friction catching member 26. The friction catching member 26 is formed to be approximately ring-like. The support pin 23a which pierces and protrudes over the hook 24 enters into a cutout portion 26b of the inner periphery of the friction catching member 26. An arc-like spring member 27 is attached to the outer periphery of the friction catching member 26. A ratchet wheel 28 with ratchet 28a formed on the end face of its outer circumference has a concave portion the shape of which portion is the same as the friction catching member 26 for storing the friction catching member 26 on the side face which can not be seen in FIG. 2. The friction catching member 26 is stored in the concave portion. The spring member 27 is pressed against the outer circumference face of the concave portion, and by this, the ratchet wheel 28 is caught on the friction catching member 26 by friction.

The acceleration sensor 35 for detecting a large extent of acceleration is attached to the lower portion of a side face 202 of the frame 200.

Figure 4A:
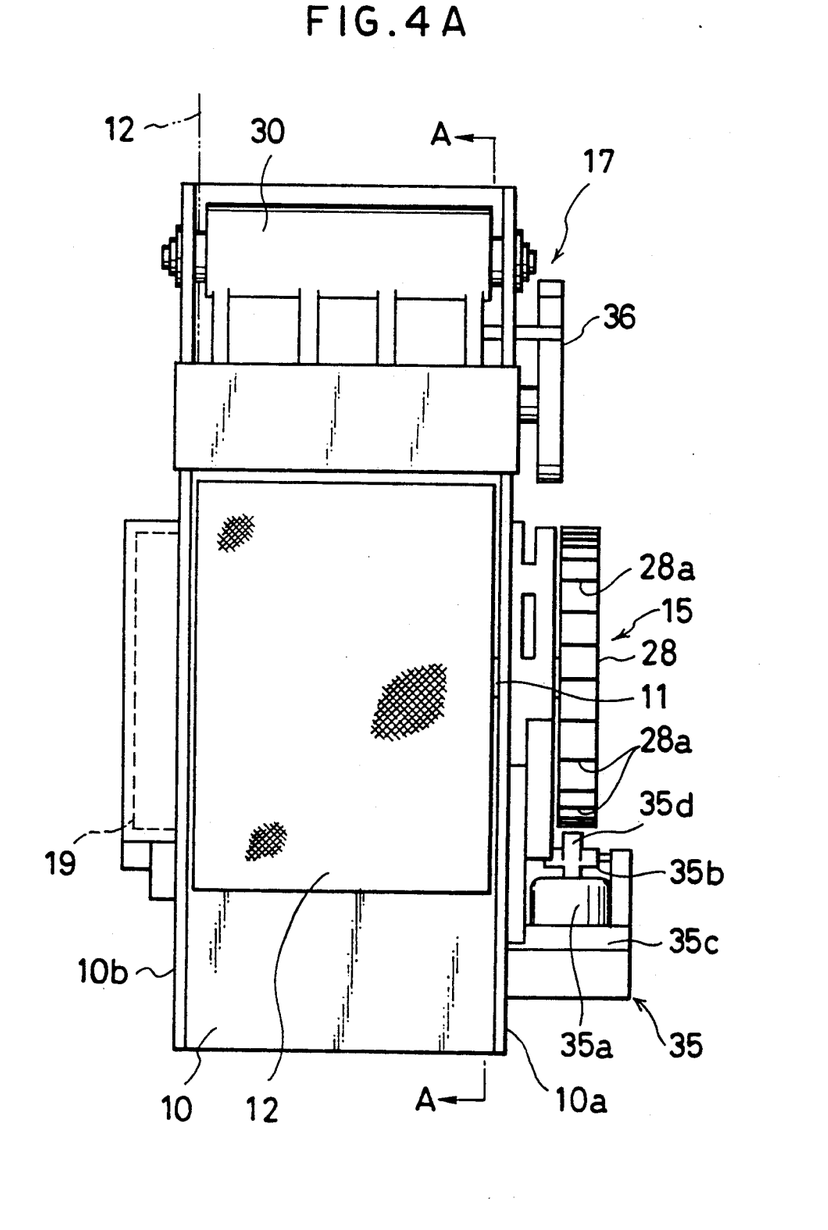
FIG. 4A is a front view showing an assembled state of the elements shown in FIGS. 2 and 3.

The acceleration sensor 35 comprises, as shown in FIG. 4A, an inertial mass support case 35c, a barrel-like inertial mass 35a which is mounted in the inertial mass support case 35c and which tilts by the action of approximately horizontal acceleration, and an actuator 35b the base end side of which is rotatably engaged with the case 35c which rotates around the case 35c in the upper direction according to the tilt of the inertial mass 35a. A tip portion 35d of the actuator 35b is engaged with the ratchet 28a which ratchet 28a is formed on the end face of the circumference of the ratchet wheel 28 when the actuator 35b rotates in the upper direction.

Next, the second emergency lock mechanism 17 is described in detail with reference to FIG. 3 also.

The second emergency lock mechanism 17 comprises the slider 22 which is attached to a case 10 so as to slide in the direction of winding on and off the reel shaft 11 (in the direction shown by the arrow Z) and the rotatable member 30 which is disposed so as to face the slider 22 and which, linked with the locking operation of the first lock mechanism 15, sandwiches and locks the seat belt 12 with the slider 22.

Figure 3:
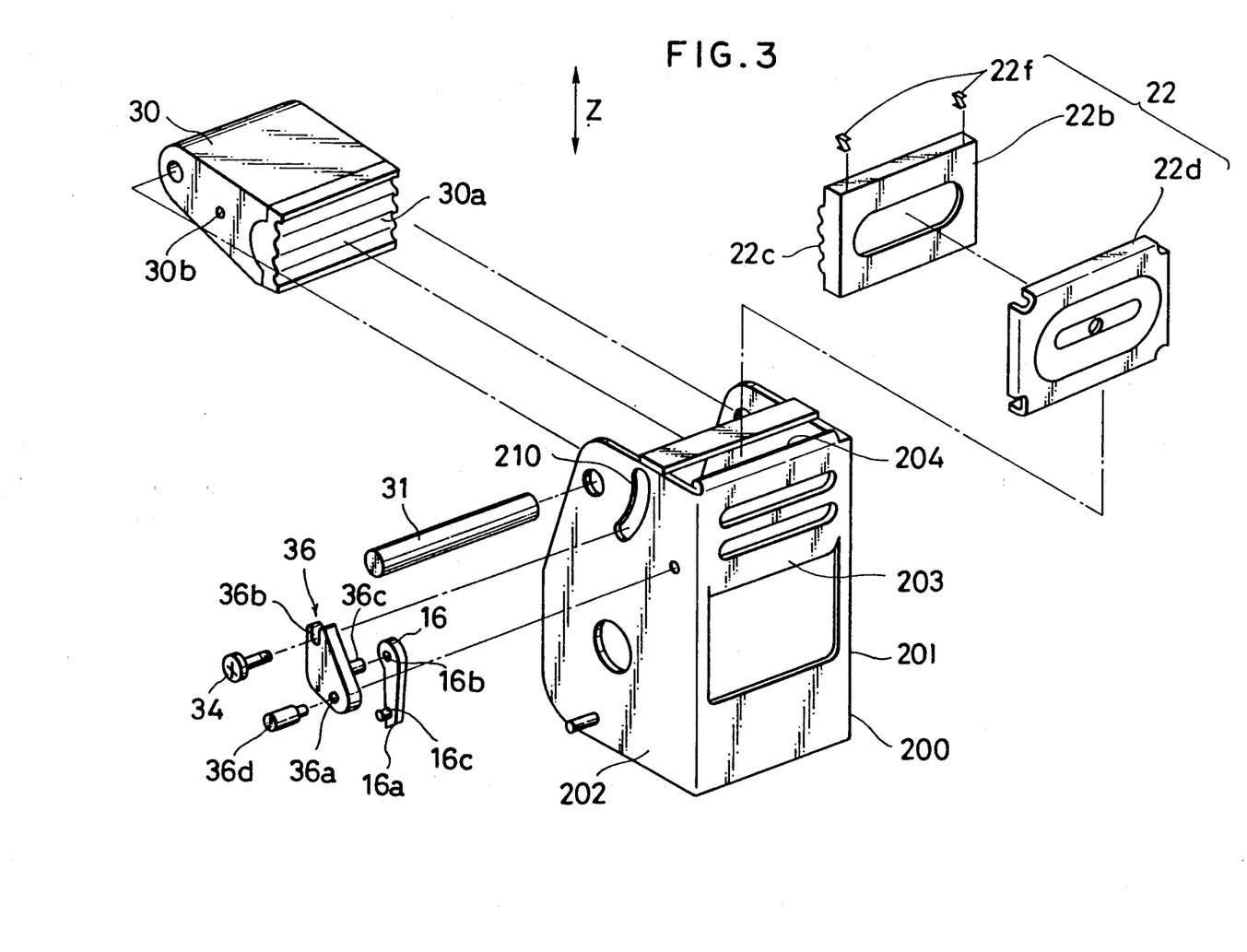
FIG. 3 is an exploded perspective view of mainly a second emergency lock mechanism which sandwiches and locks the seat belt wound off the reel shaft.

The slider 22 comprises a stopper 204 which is formed by bending a part of a back portion 203 of the case 200, a slider body 22d which is attached to the back portion 203 so as to slide in the direction of winding the seat belt 12 on and off the reel shaft 11 (in the direction shown by the arrow Z) a receiver 22b on which smoothly curved teeth are formed perpendicularly to the direction of winding the seat belt 12 on and off the reel shaft 11 (in the direction shown by the arrow Z) and which is attached to the slider body 22d, and springs 22f which are disposed under the stopper 204 and which encourage the slider body 22d in lower direction in FIG. 3. The stopper 204 is formed weakly enough to be deformed when force in the upper direction in FIG. 3 is given to the stopper 204.

The rotatable member 30 is described in detail with reference to FIGS. 1A, 1B, and 3 also.

The rotatable member 30 comprises a pusher 30a which is attached to the end portion of sandwiching the seat belt 12 and a weak portion 40 which, when force above a predetermined extent is given, can be deformed so as to shorten a distance L from a center of rotation 0 to a contact face 30c with the seat belt 12. The rotatable member 30 is disposed between both the side faces 201 and 202 and is rotatably attached to the case 200 by a shaft 31.

Figure 1A:
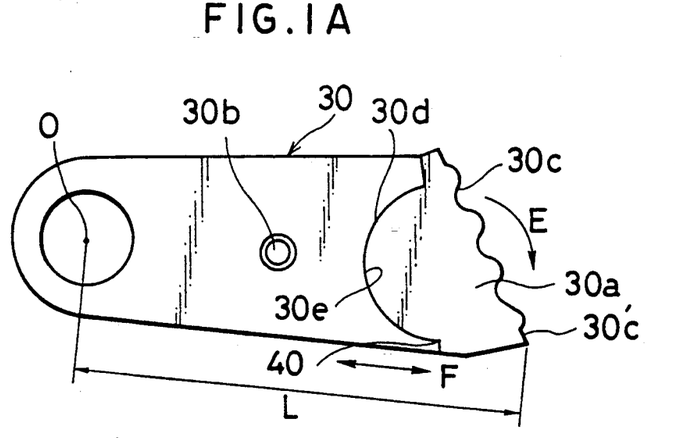
FIG. 1A is a side view of a rotatable member as an embodiment of the present invention.

A free end face portion 30e is, as shown in FIG. 1A, concave and its front view is approximately U-shaped. On the other hand, an attaching face 30d of the pusher 30a to the rotatable member 30 is convex and approximately U-shaped so as to fit in the end face portion 30e. The end face portion 30e and the attaching face 30d are attached so as not to disengage from each other by an engaging portion (not shown). In a normal state of operation, the attached state shown in the drawings is maintained. When force above a predetermined extent is given to the seat belt 12, the weak portion 40 is deformed and the rotatable member 30 is rotated in the direction shown by an arrow E.

The weak portion 40 shortens the distance L from the center of rotation 0 (the shaft 31) to the contact face 30c sandwiching the seat belt 12 with force above a predetermined extent given to the seat belt 12. In the present embodiment, the weak portion 40 is collapsed and deformed when force above a predetermined extent is given to the seat belt 12.

The collapsible portion (weak portion) 40 is formed by making the thickness thin of the lower protruding portion in the FIGS. of the end face portion 30e of the rotatable member 30 which rotatable member 30 is formed to be approximately U-shaped, so as to be collapsed by force above a predetermined extent given to the seat belt 12.

With the above structure, compressive force in the direction shown by an arrow F from the contact face 30c of the rotatable member 30 to the center of rotation 0 caused by force above a predetermined extent given to the seat belt 12 causes the pusher 30a to be rotationally displaced, the collapsible portion (weak portion) 40 is collapsed, and by this, the distance L is shortened from the center of rotation 0 (shaft 31) to the contact face 30c sandwiching the seat belt 12.

A female screw hole 30b is formed in the center portion of a side face of the rotatable member 30. A screw member 34 shown in FIG. 3 is screwed to the female screw hole 30b. One end of the transmission member 36 formed like an approximately triangular plate is engaged with the screw member 34. The transmission member 36 has a function to actuate the second emergency lock mechanism 17 linked with the first emergency lock mechanism 15.

Figure 4B:
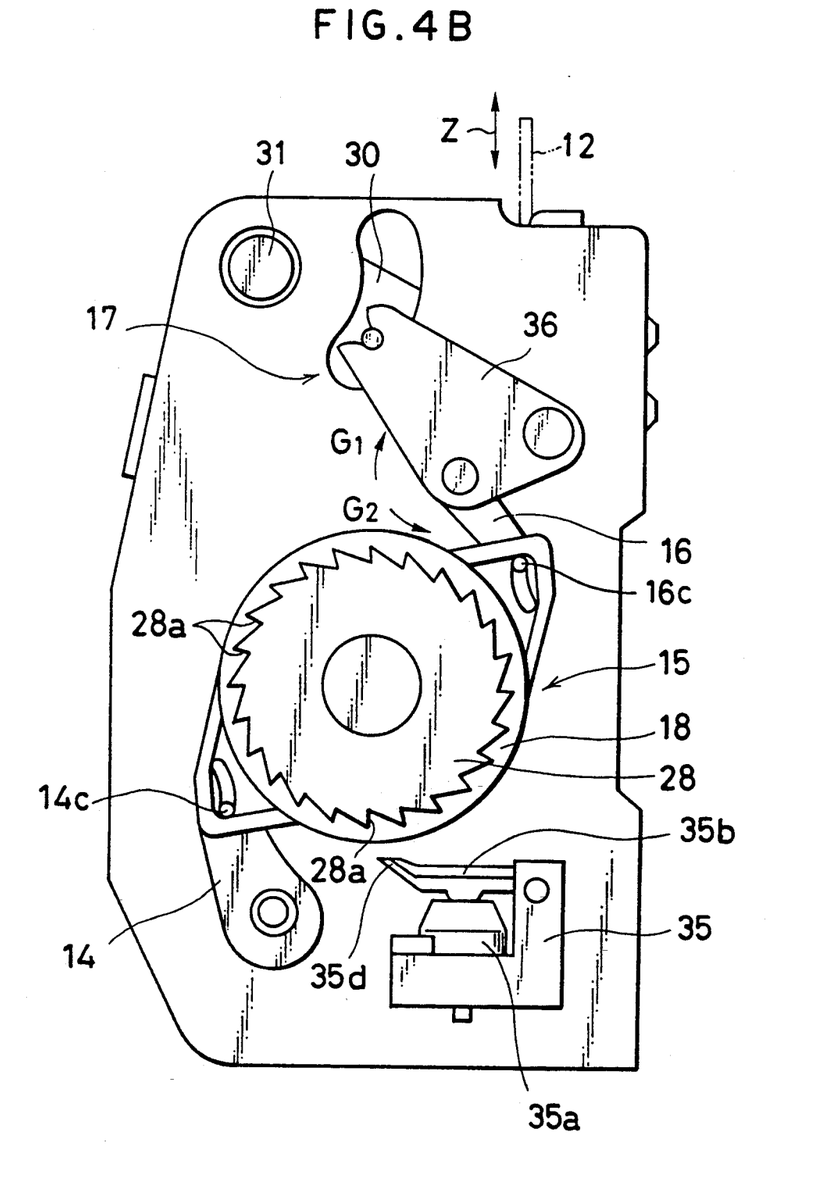
FIG. 4B is a right side view showing the assembled state.
Figure 4C:
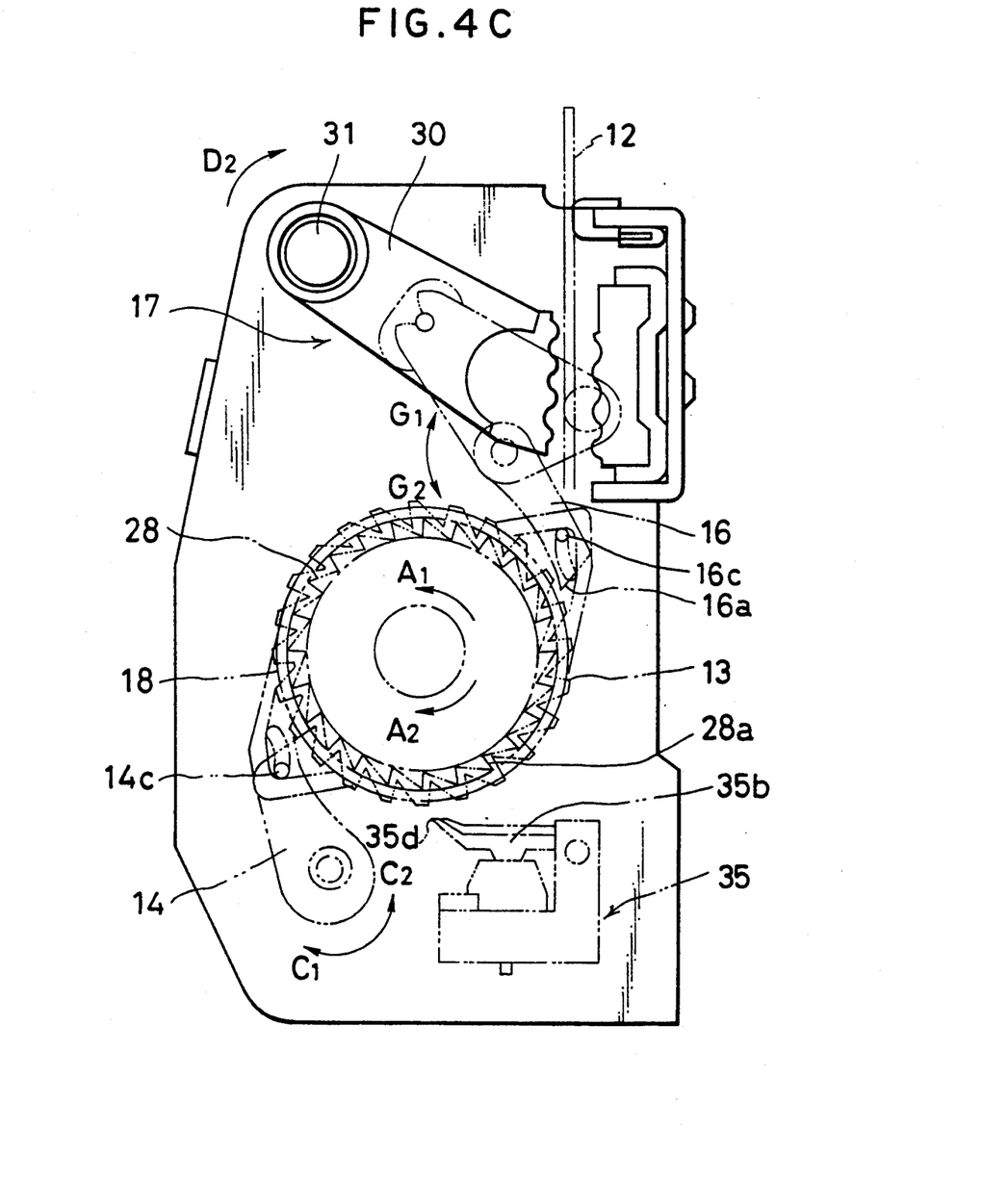
FIG. 4C is a sectional view taken along the line A—A of FIG. 4A.

In the transmission member 36, as shown in FIGS. 3, 4A, and 4B, a through hole 36a and a cutout portion 36b are formed at the two end portions, respectively, and a shaft 36c is protrudingly formed on one side face. A pin 36d, which is the center of rotation of the transmission member 36, is inserted in the through hole 36a. A screw member 34 which rotatably connects the rotatable member 30 with the transmission member 36 is inserted in the cutout portion 36b. A through hole 16b which is formed at the second catching member 16 fits on the shaft 36c.

The outline of the cutout portion 36b is a cycloidal curve so that the cutout portion 36b may be in smooth contact with the screw member 34.

When the rotatable member 30 is in the normal range of rotation, the cutout portion 36b smoothly rotates the rotatable member 30. When force above the breaking strength of the seat belt 12 is given to the seat belt 12 and the rotatable member 30 rotates out of the normal range of rotation, the rotatable member 30 can be disengaged from the screw member 34 which is provided on a side face of the rotatable member 30 so that the rotatable member 30 may not be prevented from being so rotationally displaced. A cutout portion 210 in FIG. 3 is formed so as not to prevent the operation of the rotatable member 30 on the assumption of the range of the rotational displacement of the rotatable member 30.

Next, the operation of a seat belt retractor with the above construction is described mainly in relation to the rotatable member 30 and the slider 22 with reference to FIGS. 6A through 6E also. FIGS. 6A through 6E are simplified for the purpose of clarifying the operation of the rotatable member 30. Other elements are described with reference to FIGS. 2 and 5.

Figure 6A:
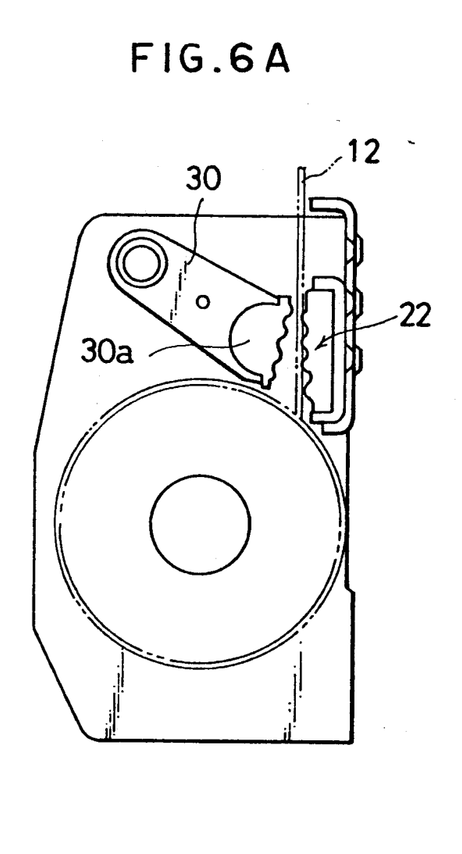

First of all, when rapid acceleration due to a collision, etc. does not act, the pusher 30a of the rotatable member 30 and the seat belt 12 are, as shown in FIG. 6A, in a non-contact state.

Figure 5:
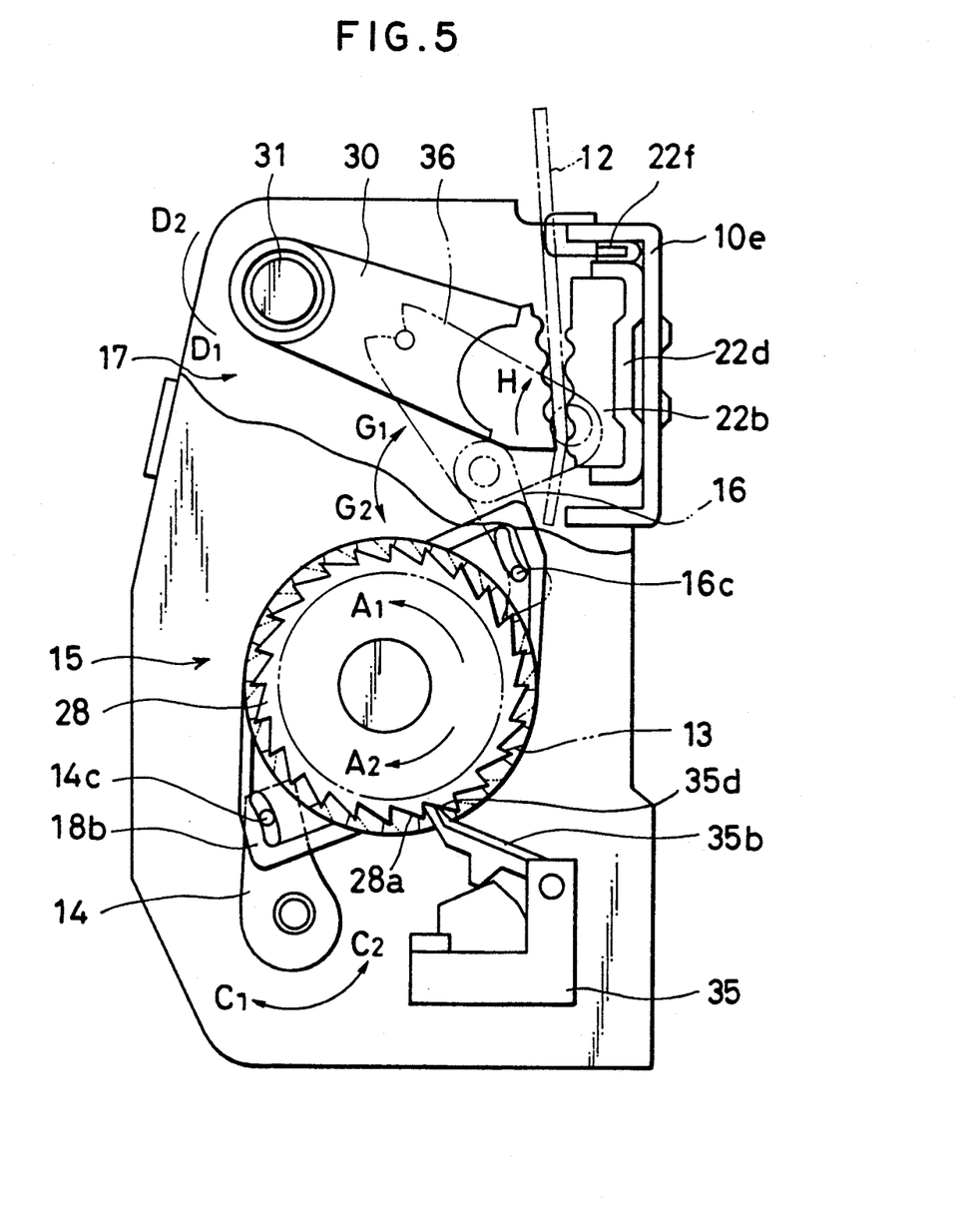
FIGS. 5, 6A, 6B, 6C, 6D, and 6E are views for describing the operation of mainly a rotatable member with a deformable portion and a slider.

In this state, when a large extent of acceleration acts, as shown in FIG. 5, the actuator 35b of the acceleration sensor 35 rotates and the tip portion 35d of the actuator 35b rotates in the upper direction, is engaged with the ratchet 28a on the outer periphery face of the ratchet wheel 28, and prevents the ratchet wheel 28 from rotating. Then, force in the direction of withdrawing the seat belt 12 off the reel shaft 11 is given to the seat belt 12. Though the reel shaft 11 tries to rotate, as the ratchet wheel 28 is prevented from rotating, the ratchet wheel 28 is relatively rotationally displaced in respect to the reel shaft 11 (in the direction shown by the arrow $A_2$).

This relative and rotational displacement is transmitted to the hook 24 through the connect pin 24a. The hook 24 sways around the support pin 23a in the direction shown by an arrow $B_2$ against the biasing force given by the compression coil spring 25.

Then, the pawl 24b of the hook 24 is engaged with the internal teeth 18a of the lock ring 18. The rotational force of the reel shaft 11 is transmitted to the lock ring 18 through the hook retainer 23, the hook 24, the pawl 24b, and the internal teeth 18a, and the lock ring 18 is rotated in the direction shown by an arrow $A_1$ against the biasing force given by the spring member 21.

By the rotation of the lock ring 18, a guide pin 16c of the second catching member 16 shown in FIG. 5 which is inserted in the second catching member guide hole 18c moves along the second catching member guide hole 18c, and by this, the second catching member 16 rotates in the direction shown by the arrow $G_1$.

When the rotational displacement of the second catching member 16 in the direction of the arrow $G_1$ reaches a predetermined angle, from that time, the first catching member 14 begins to rotate in the direction of engaging with the ratchet wheel 13 (in the direction shown by an arrow $C_1$), as shown in FIG. 5.

Then, when a pawl portion 16a of the second catching member 16 is engaged with the ratchet wheel 13, according to the rotational displacement of the ratchet wheel 13 in the direction of the arrow $A_1$, the transmission member 36 is rotationally displaced in the direction of an arrow H shown in FIG. 5. During the displacement of the transmission member 36, the first catching member 14 is not engaged with the ratchet wheel 13.

Figure 6B:
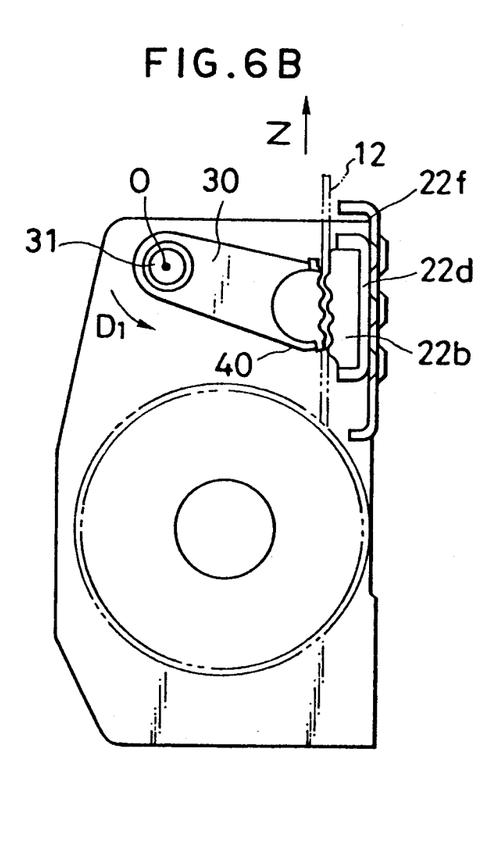

By the rotational displacement of the transmission member 36 in the direction of the arrow H, the rotatable member 30 is, as shown in FIG. 6B, rotated in the direction of the arrow $D_1$ around the shaft 31 (the center of rotation 0) and, with the slider 22 which faces the rotatable member 30, sandwiches the seat belt 12 disposed between the slider 22 and the rotatable member 30. FIG. 5 shows approximately the same state as that shown in FIG. 6B.

By the above sandwiching operation, the slider 22 slidingly moves in the upper direction according to the rotational displacement of the rotatable member 30 against the biasing force given by the spring 22f and the seat belt 12 is locked (See FIG. 6B).

The first catching member 14 is made to be engaged with the ratchet wheel 13 at a time when the seat belt 12 is sandwiched for certain. In this state, the collapsible portion (weak portion) 40 maintains the initial form without being collapsed.

In an emergency such as a collision, the seat belt 12 is locked in this way and binding of an occupant is aimed.

However, here, if the seat belt 12 is further pulled in the direction of the upper arrow Z, the rotatable member tries to be rotationally displaced in the direction shown by the arrow $D_1$ further from the locking state of the seat belt 12 as shown in FIG. 6B.

Figure 6C:
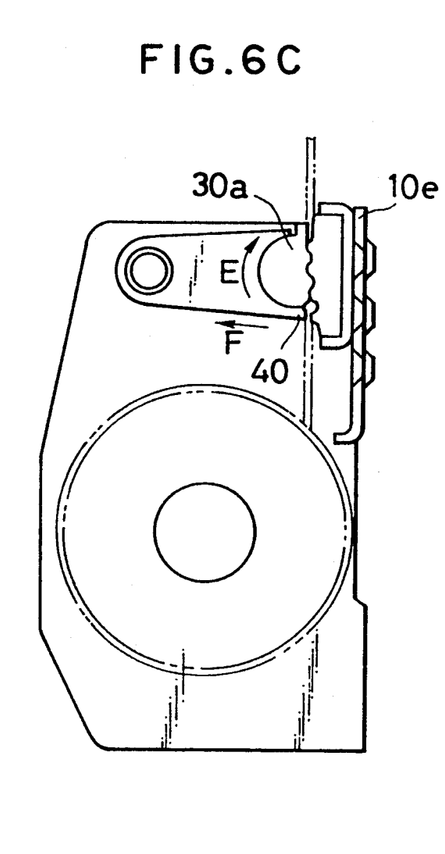
Figure 7:
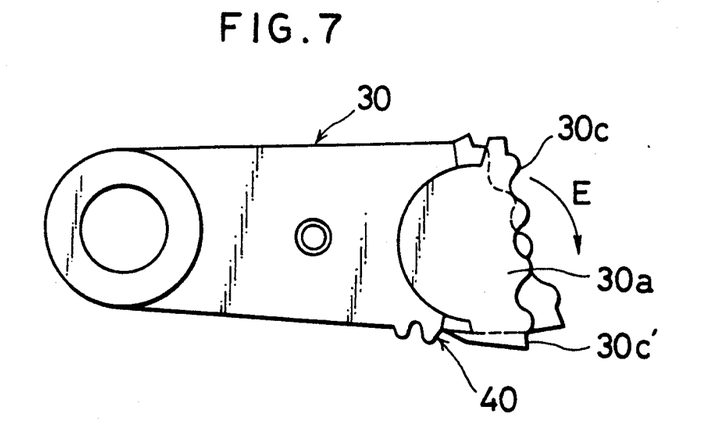
FIG. 7 is an enlarged detail view showing a state of deformation of the deformable portion.

According to the further rotational displacement of the rotatable member 30, the slider 22, while breaking the upper end portion of a sandwiching frame 10e which portion is weakly constructed, slidingly moves as shown in FIG. 6C. On the other hand, the pusher 30a is rotationally displaced in the direction of the arrow E due to pressing force given by the slider 22 as shown in FIG. 6c and the weak portion 40 begins to collapse in the direction of the arrow F due to the pressing force given by the pusher 30a. This state is also shown in FIG. 7.

Figure 6D:
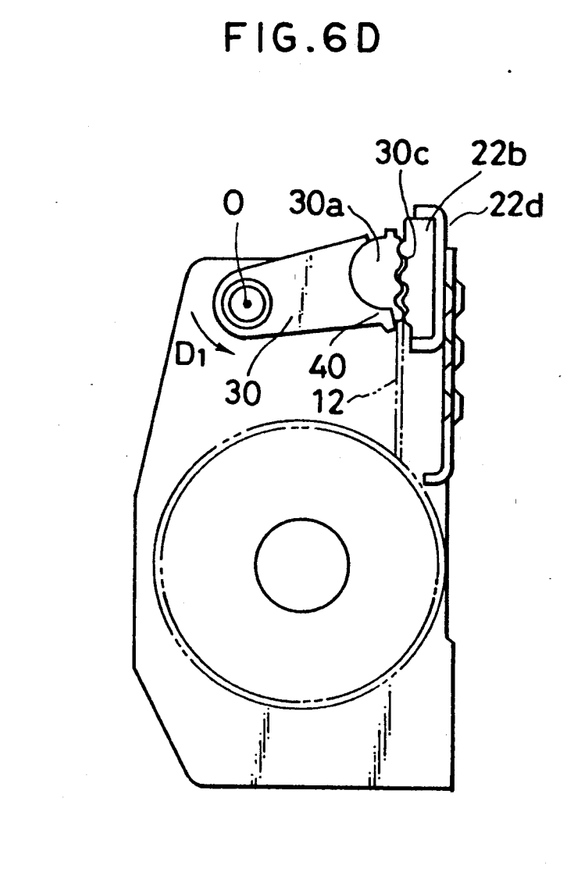
Figure 6E:
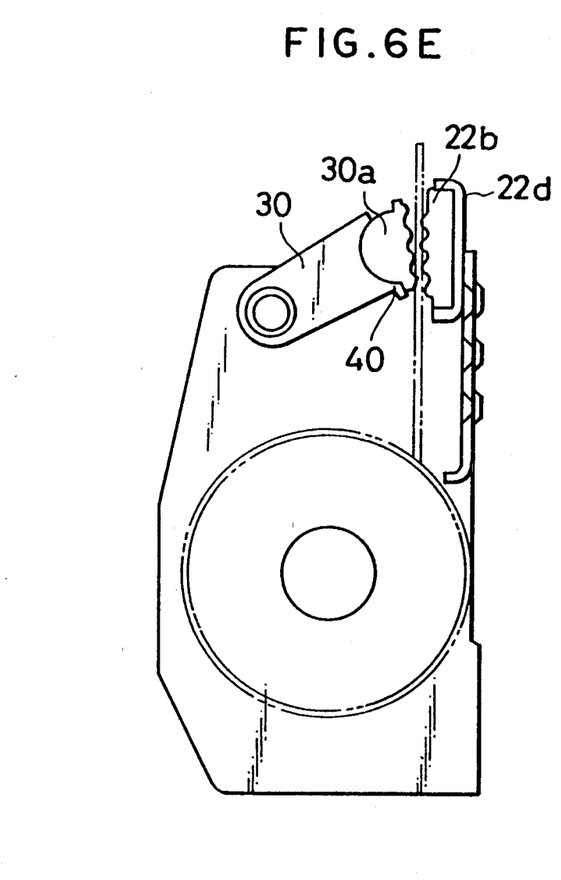

Then, as also shown in FIG. 6D, when the seat belt 12 is further drawn out in the direction of the upper arrow Z, rotatable member 30 and the slider 22 are further rotated in the direction of the arrow $D_1$ with their force of sandwiching the seat belt 12 gradually weakened. At this time, the collapsible portion 40 is further buckled and deformed due to pressing force given by the pusher 30a, and the collapsible portion 40 is deformed so that the distance from the center of rotation 0 to the contact face 30c sandwiching the seat belt 12, especially to a lower end portion 30c' of the pusher 30a shown in FIG. 7 may be shortened.

Then, at last, the seat belt 12 and the pusher 30a are disengaged from each other and the sandwiched state of the seat belt 12 is released. In this released state also, the seat belt 12 is locked by the first emergency lock mechanism 15 through the reel shaft 11.

According to the present embodiment as above described in detail, when the seat belt 12 is sandwiched by the rotatable member 30 and the slider 22, even if strong force to draw the seat belt 12 out is given and the rotatable member 30, linked with drawing the seat belt 12 out, tries to rotate by force in the direction of the arrow $D_1$, at that time, the collapsible portion 40 is collapsed and deformed so that the distance from the center of rotation 0 to the contact face 30c sandwiching the seat belt 12 may be shortened. Accordingly, the pusher 30a does not enter into the seat belt 12 and by this, force which is above the breaking strength of the seat belt 12 is not intensively given to the portion of the rotatable member 30 which sandwiches the seat belt 12. Accordingly, breaking of the seat belt 12 can be avoided.

Figure 8A:
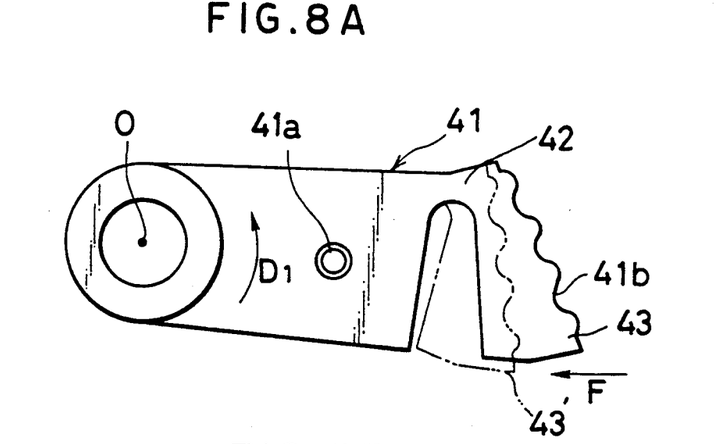
FIGS. 8A, 8B, and 9 are sectional views showing rotatable members with a deformable portion as other embodiments of the present invention.
Figure 8B:
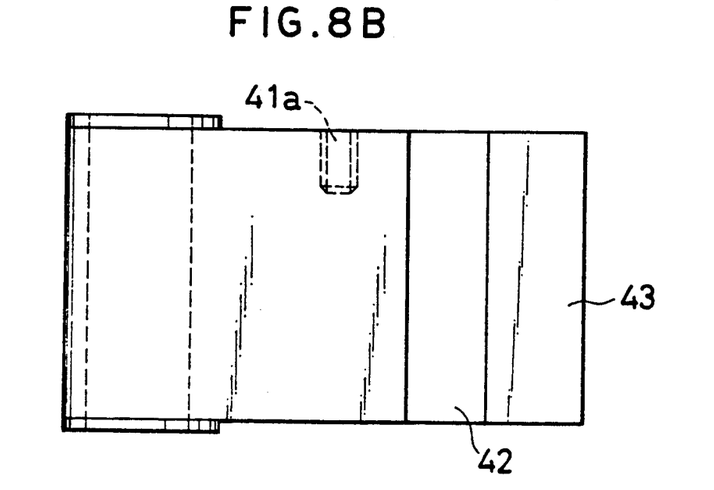

FIGS. 8A and 8B are a front view and a bottom view, respectively, which show a rotatable member with a deformable portion as another embodiment of the present invention.

Figure 1B:
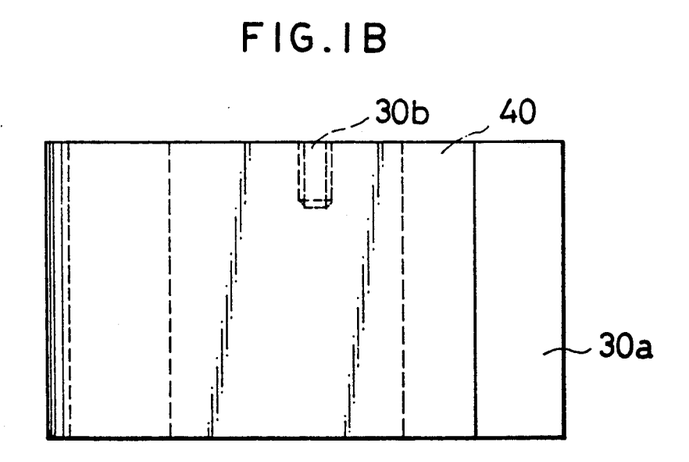
FIG. 1B is a bottom view of the rotatable member.
Figure 1C:
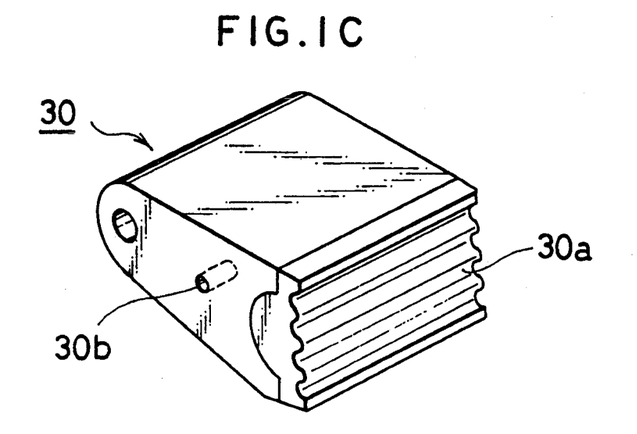
FIG. 1C is a perspective view of the rotatable member.

A rotatable member 41 shown in FIGS. 8A and 8B is approximately the same construction as that of the rotatable member 30 shown in FIGS. 1A and 1B, but the rotatable member 41 is different from the rotatable member 30 in the respect that the rotatable member 41 comprises a bending portion 42 as a weak portion which bends so as to shorten the distance from the center of rotation 0 to a sandwiching face 41b of the seat belt 12 when force above a predetermined extent is given to the seat belt 12. The screw member 34 is screwed to a female screw portion 41a.

In the above construction, when the seat belt 12 (not shown) is pulled by the strong force which seat belt 12 is sandwiched by the rotatable member 41, the rotatable member 41 tries to be rotationally displaced in the direction shown by the arrow $D_1$ further from the locking state of the seat belt 12. In this state, the bending portion begins to bend according to pressing force in the direction of the arrow F given by a slider 22. By the plastic deformation of the bending portion 42, a bent piece 43 is displaced so as to shorten the distance from the center of rotation 0 to the sandwiching face 41b of the seat belt 12, moves away from the seat belt 12, and at last releases the sandwiched state of the seat belt 12. The numeral 43' shows a deformed state of the bent piece 43.

Even if the sandwiched state of the seat belt 12 is released, as the seat belt 12 is locked by the first emergency lock mechanism 15 through the reel shaft 11, the safety of an occupant is secured.

With an embodiment comprising the rotatable member 41 having the deformable portion 42, the same effect as that of the abovementioned embodiment can be obtained.

Figure 9:
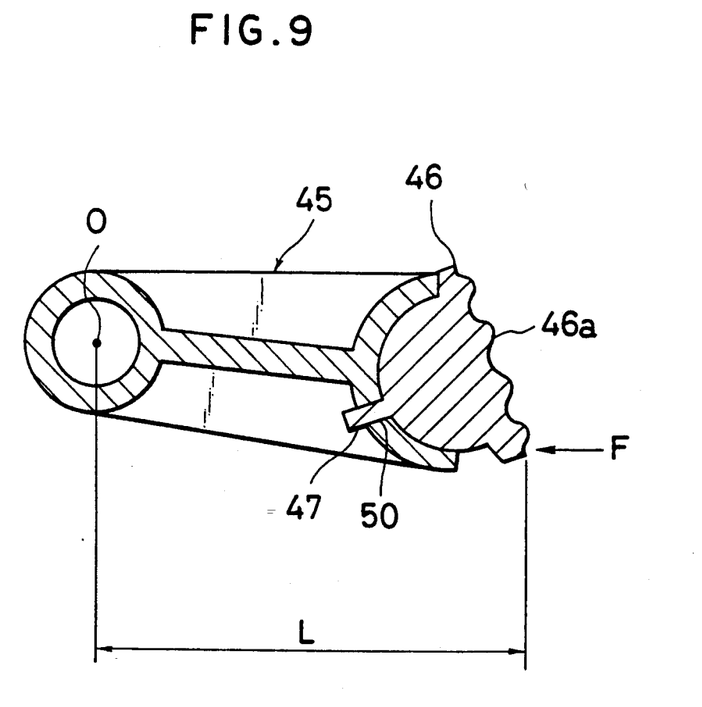

FIG. 9 is a sectional view showing a rotatable member having a weak portion as a further embodiment of the present invention.

A rotatable member 45 shown in FIG. 9 comprises a pusher 46 which is provided with a sandwiching end face portion 46a for the seat belt 12 (not shown), a shear pin 47 which maintains a predetermined posture of the pusher 46 with respect to the rotatable member 45 when force given to the seat belt 12 is below a predetermined extent, and a hole 50 for inserting the shear pin 47.

The pusher 46 is formed like a cut-in-half cylinder, its sandwiching face 46a of (contact face with) the seat belt 12 being its bottom portion. The pusher 46 is fixedly supported to be attached to the rotatable member 45 through the shear pin 47.

The breaking strength of the shear pin 47 is set so that the shear pin 47 may be broken in case force given in the direction of the arrow F which is developed by force given to the scat belt 12 gets above a predetermined extent.

In the above structure, when pressing force in the direction of the arrow F acts on the rotatable member 45, the rotatable member 45 tries to be rotationally displaced further in the same way as abovementioned. In this state, the support member (shear pin) 47 is broken by shearing force which acts between the rotatable member 45 and the pusher 46. According to the breaking, the cut-in-half cylindrical portion of the pusher 46 is rotated and displaced so that the distance L from the center of rotation 0 to the sandwiching face 46a of the seat belt 12 may be shortened, the seat belt 12 and the pusher 46 move away from each other, and at last, the sandwiching state of the seat belt 12 is released. In this released state also, the seat belt 12 is locked by the first lock mechanism 15 through the reel shaft 11.

With an embodiment comprising a rotatable member having this deformable portion, the same effect as that of the abovementioned embodiment can be obtained.

What is claimed is:

1. A seat belt retractor for a seat belt comprising:
a reel shaft for winding the seat belt therearound,
a frame for rotationally supporting the reel shaft,
a return spring situated between the reel shaft and the frame for winding the seal belt on the reel shaft,
first emergency lock means for locking the reel shaft upon detection of a predetermined acceleration,
second emergency lock means for locking the seat belt drawn out from the reel shaft upon detection of the predetermined acceleration, said second emergency lock means including a slider provided on the frame to slide parallel to movement of the seat belt in the frame when withdrawing from the reel shaft; a rotatable member having one end pivotally attached to the frame; a pusher connected to the other end of the rotatable member, said pusher facing the slider to have the seat belt between the pusher and the slider; a deformable portion without elasticity situated between the pusher and the rotatable member so that when the seat belt is withdrawn with less than a predetermined force, the seat belt is engaged between the pusher and the slider and is held therebetween without deformation of the deformable portion, and when the seat belt is withdrawn with more than the predetermined force, while the seat belt is held between the pusher and the slider, the deformable portion is deformed to prevent the holding force on the seat belt between the pusher and the slider from exceeding a predetermined holding force, and the seat belt together with the pusher and the slider are further withdrawn in a direction away from the seat belt retractor to thereby prevent breaking of the seat belt while reducing withdrawing force on the seat belt; and a stopper formed on the frame for stopping movement of the slider, said stopper deforming and permitting the slider to slide further out of the frame when force above the predetermined force is applied to the stopper, and
lock actuate means including an acceleration sensor, said lock actuate means actuating said first and second lock means.

2. A seat belt retractor according to claim 1, wherein said pusher has a face for contacting the seat belt.

3. A seat belt retractor according to claim 2, wherein said deformable portion is a portion which can be collapsed, said deformable portion being formed on one side of the rotatable member behind the pusher.

4. A seat belt retractor according to claim 2, wherein said rotatable member includes a notch behind the pusher, a portion of the rotatable member adjacent the notch forming the deformable portion.

5. A seat belt retractor according to claim 2, wherein said pusher includes a pin at a side contacting the rotatable member, and said rotatable member includes a hole for receiving the pin of the pusher, said pin constituting the deformable portion and being sheared when the seat belt is withdrawn above the predetermined force.

6. A seat belt retractor according to claim 2, wherein said pusher includes an uneven corrugated portion on a surface contacting the seat belt, said corrugated portion having ridges extending in a direction perpendicular to the withdrawing direction of the seat belt.

7. A seat belt retractor according to claim 6, wherein said slider includes an uneven corrugated portion on a surface contacting the seat belt, said corrugated portion of the slider having ridges extending in a direction perpendicular to the withdrawing direction of the seat belt and engaging the corrugated portion of the pusher while holding the seat belt therebetween.

8. A seat belt retractor according to claim 2, wherein said pusher is attached to the rotatable member so that when the belt is withdrawn with more than the predetermined force, an angle of the face of the pusher relative to the rotatable member is changed when the deformable portion deforms without elasticity.

* * * * *

UNITED STATES PATENT AND TRADEMARK OFFICE
CERTIFICATE OF CORRECTION

PATENT NO. : 5,154,368

DATED : October 13, 1992

INVENTOR(S) : Yoshiichi Fujimura et al

It is certified that error appears in the above-identified patent and that said Letters Patent is hereby corrected as shown below:

```
Column 1, line 27, delete "being";
          line 49, change "shown to FIG. 10 in" to --shown
                  in FIG. 10 to--; and
          line 56, change "enter" to --enters--.
Column 4, line 48, after "Z)" add --,--; and
          line 54, after "in" add --the--.
Column 7, line 8, after "certain." change to new paragraph.
Column 8, line 48, change "scat" to --seat--.
Column 9, line 5, change "seal" to --seat--.
```

Signed and Sealed this

Twenty-fifth Day of October, 1994

Attest:

BRUCE LEHMAN

*Attesting Officer*  *Commissioner of Patents and Trademarks*